United States Patent [19]

Beer et al.

[11] Patent Number: 5,084,074
[45] Date of Patent: Jan. 28, 1992

[54] METHOD AND APPARATUS FOR SEPARATING AND RECOVERING WATER AND LIGHT AROMATIC HYDROCARBONS FROM A GASEOUS STREAM

[75] Inventors: Gary L. Beer; James L. Skinner, both of Plano, Tex.

[73] Assignee: Atlantic Richfield Company, Los Angeles, Calif.

[21] Appl. No.: 636,477

[22] Filed: Dec. 31, 1990

[51] Int. Cl.$^5$ .............................................. B01D 53/18
[52] U.S. Cl. ........................................ 55/20; 55/31; 55/32; 55/48; 55/50; 55/195; 55/208; 55/257.7; 55/267
[58] Field of Search ................... 55/29, 31, 32, 48, 50, 55/189, 195, 208, 228, 257, 257.7, 20

[56] References Cited

U.S. PATENT DOCUMENTS

| | | | |
|---|---|---|---|
| 3,105,748 | 10/1963 | Stahl | 55/32 |
| 3,471,370 | 10/1969 | Jubin, Jr. | 55/32 X |
| 3,616,598 | 11/1971 | Floral, Jr. | 55/32 |
| 3,855,337 | 12/1974 | Floral, Jr. et al. | 55/31 |
| 4,010,009 | 3/1977 | Moyer | 55/32 |
| 4,280,867 | 7/1981 | Hodgson | 55/32 X |
| 4,674,446 | 6/1987 | Padilla, Sr. | 55/32 X |
| 4,676,806 | 6/1987 | Dean et al. | 55/32 X |
| 4,680,042 | 7/1987 | Mehra | 55/29 X |
| 4,692,179 | 9/1987 | Mehra | 55/29 X |

OTHER PUBLICATIONS

*Gas Conditioning and Processing*, 3rd Ed., by J. M. Campbell, 1974, Chapter 18, pp. 293-302.
"Quick, Manual Calculation Estimates Amount of Benzene Absorbed in Glycol Dehydrator"; By Carl W. Fitz, Jr. and R. A. Hubbard; *Oil and Gas Journal*, Nov. 23, 1987, pp. 72-76.
"Air-Cooled Overhead Condensers" By M. F. Dehne; *Chemical Engineering Progress;* (vol. 65, No. 7), pp. 51-58.

Primary Examiner—Robert Spitzer
Attorney, Agent, or Firm—F. Lindsey Scott

[57] ABSTRACT

A method and apparatus for recovering water and light aromatic hydrocarbons from a wet gas stream, by contacting the wet gas stream with an absorbent for the water and light aromatic hydrocarbons in a contactor to absorb the water and light aromatic hydrocarbons and produce a water and light hydrocarbon laden absorbent stream and a dried gas stream. The water and light aromatic hydrocarbon laden absorbent stream is heated in a regenerator to produce a vaporous water and light aromatic hydrocarbon stream and a lean absorbent for recycle to the contactor. The vaporous water and light aromatic hydrocarbon stream is passed to a condenser where liquid water and liquid light aromatic hydrocarbons are recovered and where a light gas stream is recovered for use as a fuel gas for the regenerator.

9 Claims, 1 Drawing Sheet

METHOD AND APPARATUS FOR SEPARATING AND RECOVERING WATER AND LIGHT AROMATIC HYDROCARBONS FROM A GASEOUS STREAM

FIELD OF THE INVENTION

This invention relates to drying wet gaseous streams which contain light aromatic hydrocarbons.

BACKGROUND OF THE INVENTION

In many parts of the country, natural gas as produced contains undesirably high quantities of water. In order to meet pipeline specifications, this wet gas must be dried. A common technique involves contacting the wet gas with a stream of glycol, usually triethylene glycol. The water is absorbed by the glycol. The wet glycol stream is then heated in a regenerator to drive off the water to the atmosphere and the dried glycol is then cooled and recirculated to remove additional water. The equipment for contacting the glycol and the wet gas and for drying the glycol is mechanically simple and, for smaller applications, is self-regulating after initial manual adjustment and does not require electrical power or a source of water. Many units of this type equipment are used in remote locations to dry gas from remotely located wells.

Such gases also frequently contain light aromatic hydrocarbons such as but not limited to benzene. These light aromatic hydrocarbons are also strongly absorbed by glycol. These light aromatic hydrocarbons are then driven off with the water vapor in the regenerator and discharged to the atmosphere with the water vapor. Fifty to one hundred tons per year of benzene may be released to the atmosphere from a typical unit.

A continuing effort has been directed to efforts to prevent the escape of this light aromatic hydrocarbon material into the atmosphere while still providing a unit which can operate at remote locations without the need for electrical power or water.

SUMMARY OF THE INVENTION

According to the present invention, an apparatus for separating and recovering water and light aromatic hydrocarbons from a gaseous stream containing water and light aromatic hydrocarbons is provided. The apparatus comprises a) a contactor for intimately contacting a wet gas stream and an absorbent for water and light aromatic hydrocarbons, the contactor including a wet gas stream inlet, a dried gas stream outlet, a lean absorbent inlet and a water and light aromatic hydrocarbon laden absorbent outlet;

b) a regenerator for vaporizing and removing at least a major portion of the water and the light aromatic hydrocarbons from the water and light aromatic hydrocarbon laden absorbent to produce a lean absorbent, the regenerator including a fuel gas inlet; a flue gas outlet; a water and light aromatic hydrocarbon laden absorbent inlet, the water and light aromatic hydrocarbon laden absorbent inlet being in fluid communication with the water and light aromatic hydrocarbon laden absorbent outlet from the contactor; a lean absorbent outlet, the lean absorbent outlet being in fluid communication with the lean absorbent inlet to the contactor and a water and light aromatic hydrocarbon vapor outlet;

c) a condenser for condensing the water and the light aromatic hydrocarbons, the condenser including a water and light aromatic hydrocarbon vapor inlet, the water and light aromatic hydrocarbon vapor inlet being in fluid communication with the water and light aromatic hydrocarbon vapor outlet from the regenerator; a liquid water and light aromatic hydrocarbon outlet and a light gas outlet;

d) an eductor in fluid communication with the light gas outlet and the fuel gas inlet to the regenerator for drawing light gas from the condenser into the fuel gas inlet;

e) an accumulator in fluid communication with the liquid water and light aromatic hydrocarbon outlet from the condenser for accumulating liquid water and liquid light aromatic hydrocarbons;

f) a pump in fluid communication with the lean absorbent inlet to the contactor and the lean absorbent outlet from the regenerator to pump the lean absorbent into the contactor; and, g) a temperature controller for controlling the temperature in the regenerator, the temperature controller being in temperature sensing communication with the regenerator and operatively connected to a flow regulator to control the rate of fuel gas flow to the fuel gas inlet to the regenerator.

A method for separating and recovering water and light aromatic hydrocarbons from a gaseous stream is also provided and consists essentially of;

a) contacting a wet gas stream with an absorbent for water and light aromatic hydrocarbons in a contactor to absorb water and light aromatic hydrocarbons and produce a water and light aromatic hydrocarbon laden absorbent stream and a dried gas stream;

b) passing the water and light aromatic hydrocarbon laden absorbent stream to a regenerator;

c) vaporizing at least a major portion of the water and light aromatic hydrocarbons from the water and light aromatic hydrocarbon laden absorbent stream in the regenerator to produce a lean absorbent stream for recycle to the contactor and a vaporous water and light aromatic hydrocarbon stream;

d) passing the vaporous water and light aromatic hydrocarbon stream to a condenser;

e) condensing the vaporous water and light aromatic hydrocarbon stream in a condenser to produce a liquid water and light aromatic hydrocarbon stream and a light gas stream;

f) educting the light gas stream from the condenser;

g) passing the light gas stream to the regenerator as a component of a fuel gas charged to said regenerator; and, h) controlling the temperature in the regenerator by regulating the flow of fuel gas to the regenerator.

DESCRIPTION OF PREFERRED EMBODIMENTS

In the discussion of the Figures the same numbers will be used throughout to refer to the same or similar components.

Figure 1:
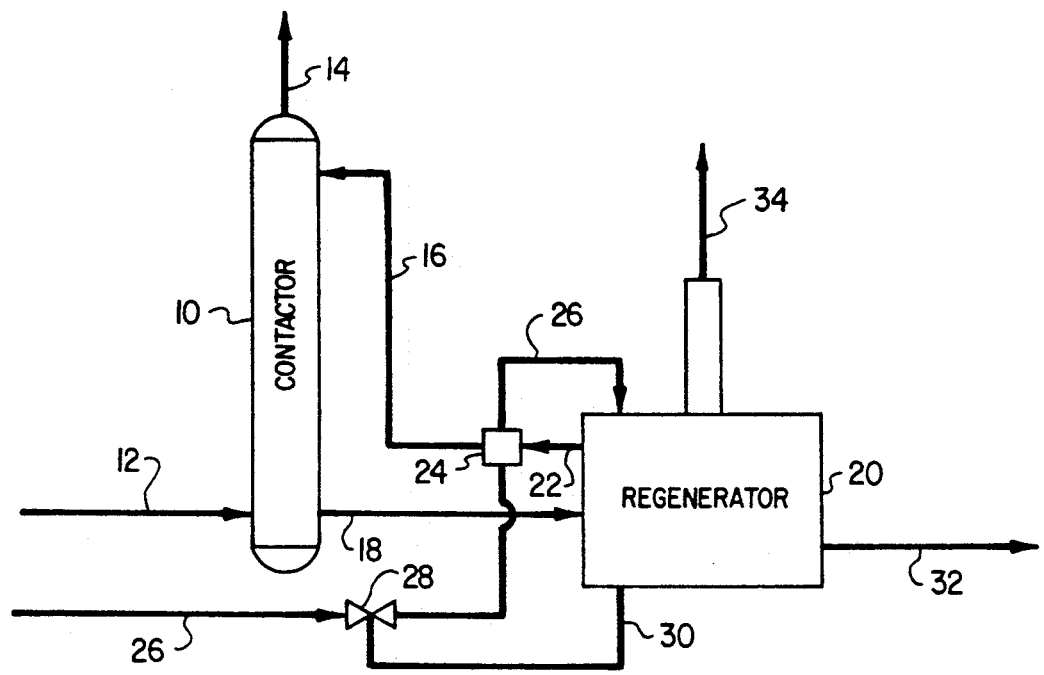
FIG. 1 is a schematic diagram of an embodiment of a glycol gas drying system as known to the art.

In FIG. 1, a glycol drying unit is shown. The unit comprises a contactor 10 in which a wet gas stream is supplied via a line 12 to contactor 10 and passes upwardly through contactor 10 and out of contactor 10 via a dried gas line 14. A dry glycol stream (lean absorbent) is charged to the upper portion of contactor 10 via a line 16 with a wet glycol stream (water and light aromatic hydrocarbon laden absorbent stream) being recovered from the lower portion of contactor 10 and passed via a line 18 to a regenerator 20. A fuel gas stream is charged to regenerator 20 via a line 26 and combusted in an amount sufficient to dry the wet glycol from line 18 to produce a lean absorbent stream which is discharged through a line 22 to a pump 24 which pumps it to contactor 10 via line 16. The fuel gas in line 26 passes through a control valve 28 which is regulated by a thermocouple (not shown) in operative contact, shown as a line 30, with regenerator 20 and valve 28 to control the amount of fuel gas passed to regenerator 20. Pump 24 is a gas-driven pump and is driven by the flow of fuel gas in line 26 through a fan to operate pump 24. In regenerator 20, the water and light aromatic hydrocarbon containing solvent is dried, with the water and light aromatic hydrocarbon vapors along with other light hydrocarbon vapors which may have been absorbed by the glycol being discharged through a line 34 to the atmosphere, and cooled to a temperature suitable for return to contactor 10. Flue gas is discharged from regenerator 20 through a line 32. As previously indicated, such units are considered to be well known to those skilled in the art and are capable of and generally operate with no source of process water or electricity.

Figure 2:
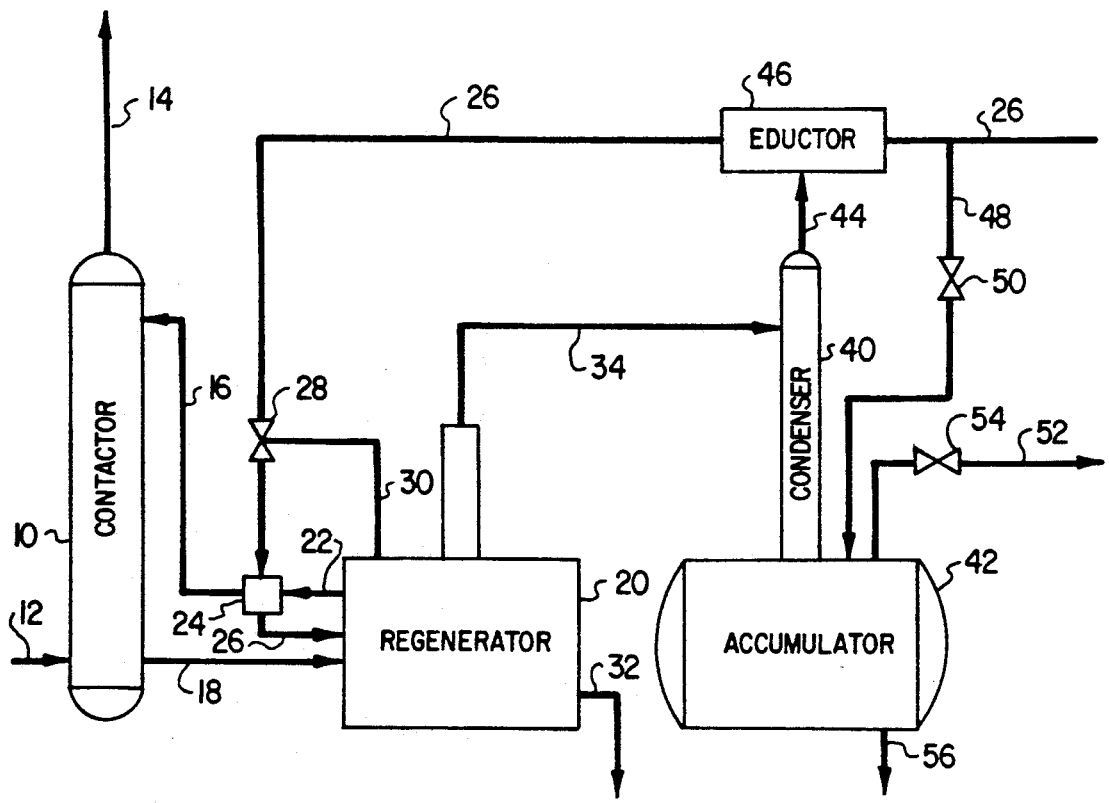
FIG. 2 is a schematic diagram of an embodiment of the present invention.

In FIG. 2, an embodiment of the present invention is shown. A similar contactor and regenerator arrangement is used to absorb the water and light aromatic hydrocarbons from the gas. The vaporous water and vaporous light aromatic hydrocarbons are then passed to a condenser 40 via line 34 where they are condensed and passed as liquids to accumulator 42. Periodically, liquid water and liquid light aromatic hydrocarbons are recovered from accumulator 42 via a line 56. It is necessary to remove light gaseous materials such as methane and the like from the upper portion of condenser 40 to control the process. These light gaseous materials are removed by an eductor 46. Eductor 46 is activated by the flow of fuel gas in line 26 through eductor 46. The flow of fuel gas is sufficient to draw light gaseous materials which have not condensed in condenser 40 from the top of condenser 40. These materials contain water vapor and considerable quantities of combustible light hydrocarbons, such as trace quantities of light aromatic hydrocarbons and light gaseous components such as methane, ethane and the like, and are desirably passed from eductor 46 via line 26 to regenerator 20 as part of the fuel gas. After combustion, the hydrocarbon components of the stream are primarily carbon dioxide and water and can be safely discharged to the atmosphere with the flue gas through line 32. To ensure safe operation of accumulator 42, a line 48 from fuel gas line 26 is positioned to maintain gas pressure on accumulator 42. The maintenance of gas pressure on accumulator 42 serves to ensure that no oxygen containing gases enter accumulator 42. Desirably, a slightly positive pressure is maintained in accumulator 42 by a pressure regulated control valve 50. Similarly, a pressure relief line 52 is provided and is controlled by a pressure-controlled valve 54.

In the practice of the present invention, a variety of absorbents can be used. Preferably the absorbent is selected from the group consisting of ethylene glycol, diethylene glycol, triethylene glycol, and mixtures thereof. The use of such materials to dry wet gas is well known to those skilled in the art as shown in *Gas Conditioning and Processing*, 3rd Ed., by J. M. Campbell, 1974, Chapter 18, pages 293-302 and an article entitled "Quick Manual Calculation Estimates Amount of Benzene Absorbed in Glycol Dehydrator", by Carl W. Fitz, Jr. and R. A. Hubbard, Oil and Gas Journal, Nov. 23, 1987, pp 72-76.

Condenser 40 is desirably an air-cooled overhead condenser of the type shown in "Air Cooled Overhead Condensers", *Chemical Engineering Progress*, Volume 65, No. 7, July 1969, pages 51-58. Condenser 40 is desirably slightly oversized to ensure that adequate cooling capacity is available to remove a major portion of the water and light aromatic hydrocarbon vapors from the stream in line 34 in all instances.

As indicated previously, the operation of the unit is without electricity or water from external sources. The functioning of contactor 10 is readily adjusted manually by operators of the unit. Generally, it is desirable that at least about 60% of the light aromatic hydrocarbons in the stream in line 34 be condensed in condenser 40. Recycling all of the stream in line 34 directly to regenerator 20 as fuel is not generally practical since the amount of light aromatic hydrocarbons contained in this stream is frequently more than sufficient to generate all the heat required in regenerator 20. In such instances, there will be no flow of fuel gas to activate pump 24 and the unit cannot function. The condensation of a major part of the light aromatic hydrocarbons in condenser 40 for recovery in accumulator 42 is accomplished as indicated previously by slightly oversizing condenser 40 for the condenser load anticipated. Light materials which do not condense in condenser 40 are recovered through a line 44 and eductor 46 and passed back as fuel to regenerator 20. Eductor 46 is activated by the flow of gas through line 26. If more hydrocarbon material is being recovered through line 44 than desirable, the unit will be self-regulating since the flow of fuel gas through line 26 will be diminished, thus reducing the effectiveness of eductor 46.

The light aromatic hydrocarbons are basically any light aromatic hydrocarbons generally found in gaseous hydrocarbon streams as produced. Such hydrocarbons typically comprise benzene, toluenes, xylenes and the like. These hydrocarbons are valuable materials and when recovered as a liquid from accumulator 42 can be marketed. Accordingly, the present invention has not only resulted in eliminating an undesirable environmental pollutant, but has resulted in the production of an additional product stream.

It will be noted that the apparatus comprising eductor 46, condenser 40 and accumulator 42 can be simply added to an existing unit for drying gas. Only connection of line 34 in FIG. 1 to condensor 40 as shown in FIG. 2 and routing line 26 through eductor 46 are required.

The unit is assembled so that the flow of liquids from condenser 40 into accumulator 42 is by gravity with the design of the contactor and regenerator apparatus being as known to those skilled in the art. Accordingly, the unit with the added equipment for the removal of the light aromatic hydrocarbons still operates without the need for external electricity or water.

Having thus described the invention by reference to certain of its preferred embodiments, it is respectfully pointed out that the embodiments described are illustrative rather than limiting and that many variations and modifications are possible within the scope of the present invention. Many such variations and modifications may appear obvious and desirable to those skilled in the art based upon the foregoing description of preferred embodiments.

Having thus described the invention, I claim:

1. A method for separating and recovering water and light aromatic hydrocarbons from a wet gas stream containing said water and said light aromatic hydrocarbons, said method consisting essentially of:
   a) contacting said wet gas stream with an absorbent for said water and light aromatic hydrocarbons in a contactor to absorb said water and said light aromatic hydrocarbons and produce a water and light aromatic hydrocarbon laden absorbent stream and a dried gas stream;
   b) passing said water and light aromatic hydrocarbon laden absorbent stream to a regenerator;
   c) vaporizing at least a major portion of said water and light aromatic hydrocarbons from said water and light aromatic hydrocarbon laden absorbent stream in said regenerator to produce a lean absorbent stream for recycle to said contactor and a vaporous water and light aromatic hydrocarbon stream;
   d) passing said vaporous water and light aromatic hydrocarbon stream to a condenser;
   e) condensing said vaporous water and light aromatic hydrocarbon stream in said condenser to produce a liquid water and liquid light aromatic hydrocarbon stream and a light gas stream;
   f) educting said light gas stream from said condenser;
   g) passing said light gas stream to said regenerator as a component of a fuel gas charged to said regenerator;
   h) controlling the temperature in said regenerator by regulating the flow of fuel gas to said regenerator.

2. The method of claim 1 wherein said absorbent is selected from the group consisting of ethylene glycol, diethylene glycol, triethylene glycol and mixtures thereof.

3. The method of claim 1 wherein said light aromatic hydrocarbons are selected from the group consisting of benzene, toluenes, xylenes and mixtures thereof.

4. The method of claim 1 wherein at least about sixty percent of said light aromatic hydrocarbons in said vaporous water and light aromatic hydrocarbon stream are recovered in said liquid water and liquid light aromatic hydrocarbon stream.

5. The method of claim 1 wherein said gaseous stream and said absorbent are counter currently contacted in said contactor.

6. An apparatus for separating and recovering water and light aromatic hydrocarbons from a gas stream containing said water and light aromatic hydrocarbons, said apparatus comprising:
   a) a contactor for intimately contacting said gas stream and an absorbent for said water and said light aromatic hydrocarbons, said contactor including a gas stream inlet, a dried gas stream outlet, a lean absorbent inlet and a water and light aromatic hydrocarbon laden solvent outlet;
   b) a regenerator for vaporizing and removing at least a major portion of said water and said light aromatic hydrocarbons from said water and light aromatic hydrocarbon laden solvent to produce a lean absorbent, said regenerator including a fuel gas inlet; a flue gas outlet; a water and aromatic hydrocarbon laden absorbent inlet, said water and light aromatic hydrocarbon laden absorbent inlet being in fluid communication with said water and light aromatic hydrocarbon laden absorbent outlet from said contactor; a lean absorbent outlet, said lean absorbent outlet being in fluid communication with said lean absorbent inlet to said contactor and a water and light aromatic hydrocarbon vapor outlet;
   c) a condenser for condensing said water and said light aromatic hydrocarbons, said condenser including a water and light aromatic hydrocarbon vapor inlet, said water and light aromatic hydrocarbon vapor inlet being in fluid communication with said water and light aromatic hydrocarbon vapor outlet from said regenerator; a liquid water and liquid light aromatic hydrocarbon outlet and a light gas outlet;
   d) an eductor in fluid communication with said light gas outlet and said fuel gas inlet to said regenerator for to draw light gas from said condenser into said fuel gas inlet;
   e) an accumulator in fluid communication with said liquid water and liquid light aromatic hydrocarbon outlet from said condenser for accumulating said liquid water and said liquid light aromatic hydrocarbons;
   f) a pump in fluid communication with said lean absorbent inlet to said contactor and said lean absorbent outlet from said regenerator to pump said lean absorbent into said contactor; and
   g) a temperature controller for controlling the temperature in said regenerator, said temperature controller being in temperature sensing communication with said regenerator and operatively connected to a flow regulator to control the rate of fuel gas flow to said fuel gas inlet.

7. The apparatus of claim 6 wherein a purge gas line is positioned in fluid communication with said accumulator and a fuel gas line to maintain a pressure greater than atmospheric pressure in said accumulator.

8. The apparatus of claim 6 wherein said accumulator includes a pressure relief outlet.

9. An apparatus for recovering water and light aromatic hydrocarbons from a water and light aromatic hydrocarbon vapor stream received from an absorbent gas drying unit for separating water and light aromatic hydrocarbons from a wet gas stream containing said water and light aromatic hydrocarbons, said absorbent gas drying unit including:
   a) a contactor for intimately contacting said wet gas stream and an absorbent for said water and said light aromatic hydrocarbons, to produce a dried gas stream and a water and light aromatic hydrocarbon laden absorbent stream;
   b) a regenerator for vaporizing and removing at least a major portion of said water and said light aromatic hydrocarbons from said water and light aromatic hydrocarbon laden absorbent stream to produce a lean absorbent, for recycle to said contactor and a water and light aromatic hydrocarbon vapor outlet;
   c) a pump in fluid communication with said contactor and said regenerator to pump said lean absorbent into said contactor; and
   d) a temperature controller for controlling the temperature in said regenerator, said temperature controller being in temperature sensing communication with said regenerator and operatively connected to a flow regulator to control the rate of fuel gas flow to said regenerator through a fuel gas inlet;

said apparatus comprising:
e) a condenser for condensing said water and said light aromatic hydrocarbons, said condenser including a water and light aromatic hydrocarbon vapor inlet, said water and light aromatic hydrocarbon vapor inlet being adapted for fluid communication with said water and light aromatic hydrocarbon vapor outlet from said regenerator; a liquid water and liquid light aromatic hydrocarbon outlet and a light gas outlet;
f) an eductor in fluid communication with said light gas outlet to draw light gas from said condenser;
g) an accumulator in fluid communication with said liquid water and light aromatic hydrocarbon outlet from said condenser for accumulating said liquid water and said liquid light aromatic hydrocarbons.

* * * * *